Sept. 21, 1943.    R. ORTIZ    2,329,938
PROCESS FOR CONNECTING HALVES OF TUBULAR DUCTS
Filed May 30, 1942    2 Sheets-Sheet 1
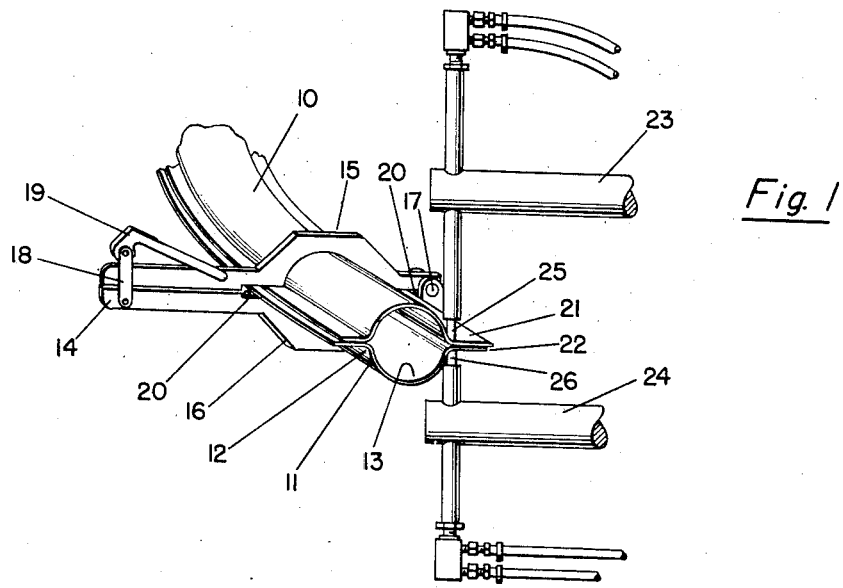
Fig. 1
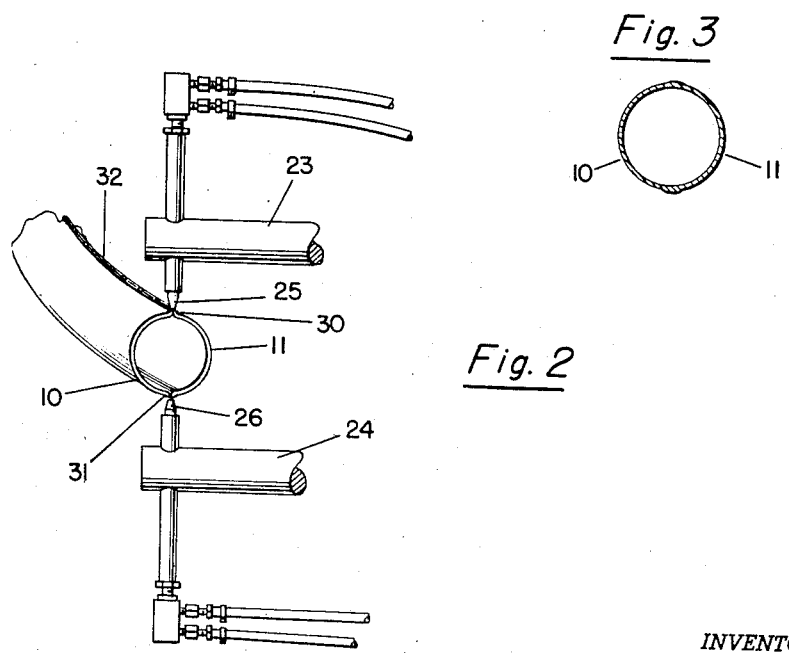
Fig. 3
Fig. 2
INVENTOR
Raymond Ortiz
BY
Everett N. Curtis
ATTORNEY Sept. 21, 1943.　　　　R. ORTIZ　　　　2,329,938
PROCESS FOR CONNECTING HALVES OF TUBULAR DUCTS
Filed May 30, 1942　　　2 Sheets-Sheet 2
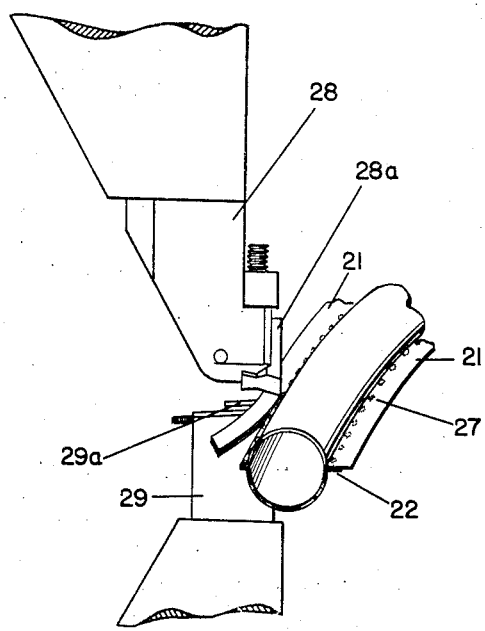
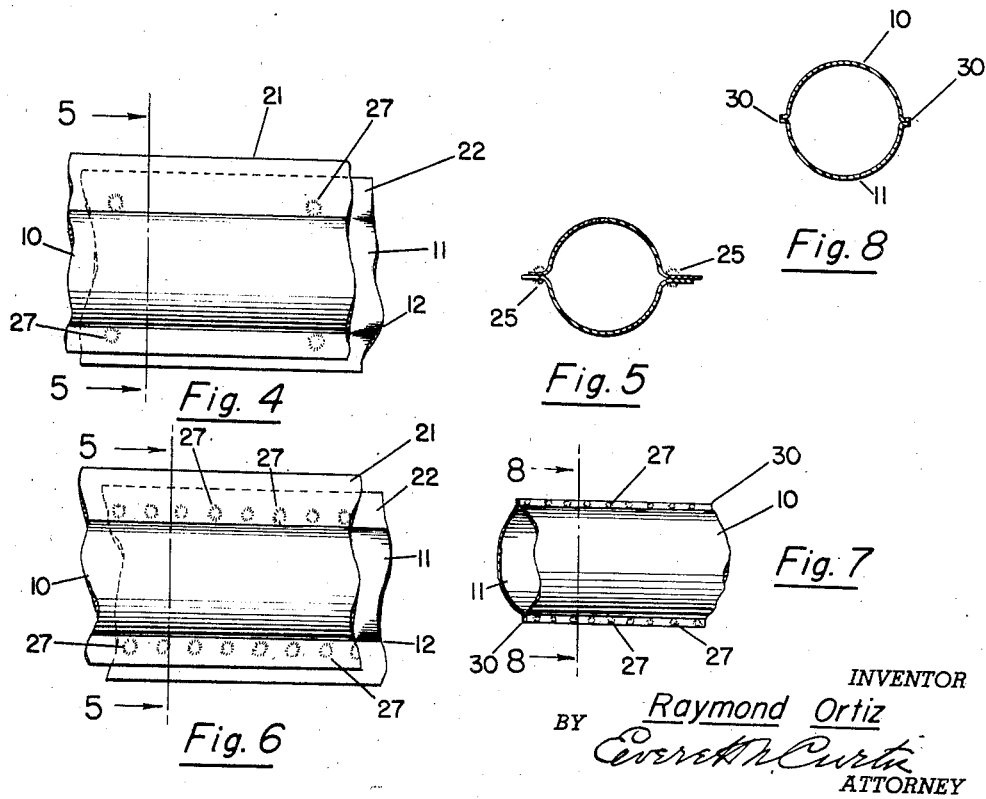
INVENTOR
Raymond Ortiz
BY
ATTORNEY Patented Sept. 21, 1943

2,329,938

UNITED STATES PATENT OFFICE 2,329,938

PROCESS FOR CONNECTING HALVES OF TUBULAR DUCTS

Raymond Ortiz, San Diego, Calif., assignor to The Ryan Aeronautical Co., San Diego, Calif., a corporation of California Application May 30, 1942, Serial No. 445,174

2 Claims. (Cl. 29—156)

My invention relates to processes for connecting halves of tubular ducts, particularly tubes or conduits employed in aircraft manifold construction or fabrication for connection with the exhaust ports of combustion engines, and its objects are to bring about and maintain a better registration of the conduit halves and to prevent displacement thereof while welding is taking place; to guard against the opening of the seams during the welding operation; to form a weld capable of enduring and resisting the high temperatures encountered through the passage of exhaust gases through the manifolds; and in general to produce a more satisfactory type of weld than has heretofore been accomplished in the uniting of tubular halves of conduits of this character.

In modern aircraft construction, the formation of manifold tubes for the carrying off and disposal of the exhaust gases from the airplane combustion engines is an important feature. As now constructed in airplane plants, such tubes are usually made by the uniting of two right and left semi-cylindrical halves, which are stamped by conventional Kirksite dies out of thin strips of stainless steel, nickel alloy or other heat resistant material. The proper registration of these two semi-cylindrical halves to form a cylindrical tube is a difficult operation, and requires considerable skill and attention to ensure the production of a reasonably perfect conduit. In the common practice each of the halves when stamped has an excess of material forming a fin extending out from the rounded part forming the wall of the tube, and this fin known as "flash" must be trimmed off before the seams between the adjacent abutting edges of the cylindrical parts of the halves can be welded together. In ordinary practice, after the halves have been brought into registering contact, the flash is cut off within about an eighth of an inch outside the cylindrical wall, which will allow sufficient material to finish the weld seam. The great difficulty encountered in this procedure is that of accurately registering and tacking the right and left semi-cylindrical parts, and of maintaining such registration while the flash is being removed and while the seams are being welded to form the closed tube.

In my improved process, however, the possibility of an imperfect weld always present in the old procedure is rendered practically negligible. The semi-cylindrical parts carrying their flash as they come from the drop hammers are carefully matched and are held together with clamps specially formed and constructed to hold such parts with their opposing fins or flash in close contact in such matched registration. Thereupon, before the flash is removed, the abutting portions of the fins are spot welded together in welds located preferably about six inches apart. These welds are preliminary in character, and are located in such places as may be found the most desirable for the purpose of temporarily tacking together the halves of the conduit in the said matched registration accomplished through use of the clamps. The clamps are then taken off, and the fins are again spot welded as closely as possible to the wall of the conduit, these additional welds being preferably about three quarters of an inch apart. Such welds are for additional reinforcement and greatly aid in maintaining accurate registration of the halves of the conduit. Thereafter, the flash of both halves is cut off by shears to within about an eighth of an inch or less of the body of the conduit, and the ridges formed at the seams are fluxed and welded by fusing the same flush with the wall of the conduit. Such final welding may be accomplished by well known welding methods heretofore employed for the purpose, or by a variation of such methods hereinafter described where the additional spot welding is applied directly to the top of the seam, and the upper and lower edges thereof contacted and welded simultaneously, and thereafter fused together by any standard method of welding.

Attention is hereby directed to the drawings, illustrating apparatus preferably employed in carrying out my improved processes, in which similar numerals of designation refer to similar parts throughout the several views, and in which—

Figure 1 is a view showing in elevation and perspective the stamped halves and flash of a manifold duct in process of construction, the said halves being held together in juxtaposition by a fitted clamp, and the flash being in position for spot welding apparatus there shown;

Fig. 2 is a view in elevation of the welding apparatus, showing in perspective a manifold duct from which the flash has been sheared off and which is in position for spot welding the trimmed edges of the seams of said duct both above and below;

Fig. 3 is a transverse section of a manifold duct after the two halves forming such duct have been united and welding thereof completed;

Fig. 4 is a plan view of the two halves of an uncompleted manifold duct with unsheared overlapping flash thereon, showing the same attached together by six inch center spot welding;

Fig. 5 is a transverse section on line 5—5 of each Fig. 4 and Fig. 6, looking in the direction of the arrows;

Fig. 6 is a plan view of two halves of an uncompleted manifold duct with the unsheared overlapping flash thereon, showing the two parts attached by three-quarter inch center spot welding;

Fig. 7 is a plan view of the same duct shown in Fig. 6, after the flash has been sheared off and just prior to fusion of the seam;

Fig. 8 is a transverse section of the duct shown in Fig. 7, looking in the direction of the arrows, and Fig. 9 is a side elevation of a nibbler shear employed to cut off the shear or fins of a manifold duct in process of construction.

Referring to the drawings, after the two halves 10 and 11 have been stamped out of elongated strips of sheet metal or other suitable material so as to form when brought into matched registration the duct 12 containing the cylindrical passageway 13, these two parts are carefully contacted in such registration through the use of the clamp 14; the upper and lower arms 15 and 16 of which are respectively shaped to engage with the adjacent curvilinear contour of the exterior surface of said duct and are so positioned as to ensure accurate registration of said parts regardless of the amount of flash extending therefrom.

As will be observed from Fig. 1, the two arms 15 and 16 of said clamp are hinged at the point 17, and their free ends are fastened together by the links 18 and locking rod 19 pivotally mounted thereon; and while the opposing parts of the clamp adjacent to the duct are shaped closely to fit the wall of the same, the openings 20 formed between the arms of said clamp are of sufficient width and extent to receive the overlapping fins or flash 21 and 22 of the two halves of the duct and to provide ample clearance therefor. In practice two or more of these clamps may be provided at such places as needed to bring about and to preserve the required matched registration of conduit halves while spot welding is taking place. These clamps are made preferably of forged steel, but may be of any suitable material, and necessarily must be of sturdy construction.

Illustrated in Fig. 1 are upper and lower arms 23 and 24 and connections of a conventional spot welding machine, the electrodes 25 and 26 of which are shown above and below in contact with the outwardly extending flash or fins of the halves 10 and 11, and in operative position to effect a spot weld, serving to weld together at one spot the abutting parts of said fins. Such spot welds 27 may be at considerable intervals as shown in Fig. 4, where the spacing is indicated at approximately six inches apart, or may be at closer intervals as shown in Fig. 6 where the spacing indicated is as close as three quarters of an inch apart. As hereinafter explained, the longer spaced spot welding is accomplished while the two halves are clamped as aforesaid, and the shorter spaced spot welding is done after the said clamps have been removed and present no obstruction to a closer weld.

For the purpose of trimming off the flash to within one eighth of an inch or less of the body of the manifold duct 12, I prefer to employ a nibbler shear, the blade holders 28 and 29, and blades 28a and 29a of which are indicated in Fig. 9, and are operated in the manner well understood in the art. Any other form of shear, however, suitable for the purpose could be used, provided that the cut, close to the body of the manifold duct 12, leaving the narrow flange or seam 30 as shown in Fig. 8, can thereby be accomplished.

In Fig. 2 I have shown, in longitudinal position for welding upon the same spot welding machine as shown in Fig. 1, the manifold duct after it has been sheared of its flash as shown in Fig. 8. It will be observed, however, that the said duct instead of being in the transverse position shown in Fig. 1, with its halves one above the other, is longitudinally positioned with the trimmed edges 32 of the upper seam in contact with the electrode 25 and the trimmed edges 31 of the lower seam on the opposite side of the duct in contact with the electrode 26. This arrangement, I have found to be advantageous in that the further spot welding of both of said seams is accomplished simultaneously above and below. Also the spot welds, being applied directly to the trimmed edges of the seams instead of at the sides thereof and being preferably formed close together, serve more effectively to close the line of juncture of each seam and to guard against any possibility of their opening during the final welding operation My improved process for connecting the two halves of tubular ducts is carried out substantially as follows: The two parts with their flash as they come from the drop hammer, are carefully matched together and to form a perfect tubular passageway throughout their length and are locked in such registered position by the specially constructed clamps 14, one of which is shown in Fig. 1; as many clamps being used as may be necessary for such purpose. Such two halves then being in clamped registration as shown in Fig. 1, the fins thereof are spot welded together on approximately six inch centers at the longer intervals indicated in Fig. 4. Thereupon the said clamps are removed, and this long interval welding reinforced by further spot welding of the abutting parts as shown in Fig. 6. This shorter interval spot welding is important as it serves firmly to unite these contacting parts and to avoid displacement thereof when subjected to the further steps in my process. The reason that it is necessary to remove the clamps 14 for such purpose is that they would be in the way and would interfere with the making of such closer spot welds. Preferably all of these welds are made as closely as possible to the cylindrical wall of the duct without encroaching thereon. As a result of these two steps of spot welding, I have been able to secure a much more rigid connection of the parts of the conduit halves than has heretofore been deemed possible in the art, and thereby to ensure against any warping or springing open of the seams 30 in the completion of the conduit.

The parts being thus secured, the flash is then carefully trimmed off by the shear shown in Fig. 9 to preferably within one eighth of an inch or less of the stack body of the duct; the result of such trimming being shown in Figs. 7 and 9. Thereupon, as is well known in the art, the parts adjacent to the seam or flange 30, are fluxed on the underneath side and welded by fusing the flange flush with the body of the duct as shown in Fig. 3.

As a variation of this method, I have found it advantageous after the halves have been clamped and spot welded on six inch spacing as heretofore described, to employ the method of spot welding shown in Fig. 2, in which the weld may be applied directly to the edges of the trimmed seam 30. This method permits a very satisfactory type of weld and permits the two seams, above and below to be welded at the same time, and to save one half the time required to weld each seam separately, as is the case in the process heretofore described in connection with Fig. 1. Also, I have found that by overlapping the spots of spot welding it is possible to secure a satisfactory permanent weld without the need of any subsequent welding.

What I claim and desire to secure by Letters Patent is:

1. The method of forming a tube from two mated pre-formed sheet metal half-tubular sections each having flash flanges of indefinite widths extending outwardly therefrom along its two longitudinal edges and disposed in face to face superimposed relationship to each other, which comprises spot welding together the flash flanges at points spaced apart longitudinally therealong and close to the tube to hold the sections in mating relationship to each other, removing the outer marginal portions of the flash flanges to leave said flanges of narrow and uniform widths and to contain approximately just the proper amount of metal to be fused and welded into continuous joints extending longitudinally along the tube substantially flush with the outer face thereof, and then fusing and welding said narrow flash flanges into continuous joints extending longitudinally along the tube substantially flush with the outer face thereof.

2. The method of forming a tube from sheet metal having flash-flanged free edge portions thereof of indefinite widths brought together and disposed in face to face superimposed relationship to each other to form the tube, which comprises spot welding together the flash flanges at points spaced apart longitudinally therealong and close to the tube, removing the outer marginal portions of the flash flanges to leave said flanges of narrow uniform widths and to contain approximately just the proper amount of metal to be fused and welded into a continuous joint extending longitudinally along the tube substantially flush with the outer face of the tube, and then fusing and welding said narrow flash flanges into a continuous joint extending longitudinally along the tube substantially flush with the outer face thereof.

RAYMOND ORTIZ.